May 16, 1950 O. H. WILLIFORD 2,508,052

TROUBLE RECORDER CONTROL CIRCUIT

Filed Oct. 29, 1948 9 Sheets-Sheet 1

INVENTOR
O. H. WILLIFORD
BY C. Mattice
ATTORNEY

TROUBLE RECORDER CONTROL CIRCUIT

Filed Oct. 29, 1948 9 Sheets-Sheet 2

INVENTOR
O. H. WILLIFORD
BY C. Mathie
ATTORNEY

INVENTOR
O. H. WILLIFORD
BY C. Mattice
ATTORNEY

INVENTOR
O. H. WILLIFORD
BY C. Mattice
ATTORNEY

TROUBLE RECORDER CONTROL CIRCUIT

Filed Oct. 29, 1948

INVENTOR
O. H. WILLIFORD
BY C. Mattice
ATTORNEY

TROUBLE RECORDER CONTROL CIRCUIT

Filed Oct. 29, 1948 9 Sheets-Sheet 6

INVENTOR
O. H. WILLIFORD
BY
C. Mattice
ATTORNEY

INCOMING REGISTER

INVENTOR
O. H. WILLIFORD
BY C. Mattice
ATTORNEY

INVENTOR
O. H. WILLIFORD
BY C. Mattice
ATTORNEY

May 16, 1950 O. H. WILLIFORD 2,508,052

TROUBLE RECORDER CONTROL CIRCUIT

Filed Oct. 29, 1948 9 Sheets-Sheet 9

INVENTOR
O. H. WILLIFORD
BY
C. Mattice
ATTORNEY

Patented May 16, 1950

2,508,052

UNITED STATES PATENT OFFICE 2,508,052

TROUBLE RECORDER CONTROL CIRCUIT

Oscar H. Williford, Bronxville, N. Y., assignor to Bell Telephone Laboratories, Incorporated, New York, N. Y., a corporation of New York Application October 29, 1948, Serial No. 57,391

11 Claims. (Cl. 179—175.2)

This invention relates to automatic telephone systems and has for its object the maintenance of satisfactory service by providing permanent records of troubles as they occur.

The more complex telephone system such as those employing panel type or cross bar type switches are operated by means of control circuits which are common to all or a large part of the switching equipment. When a trouble develops in such a system, the tracing of the trouble to its source is an exceedingly difficult problem. To assist the maintenance force in its work there have been developed indicators composed of relays and lamps which may be associated with a control circuit having trouble, and which receive from the control circuit an indication of the factors involved in the attempted connection and lock in this indication until an attendant can observe the indication and release the indicator. This arrangement has several drawbacks since it requires the continued presence of an attendant, prevents the indication of other troubles occurring before the indicator is released and introduces the delay and possible errors of manually recording the trouble indicated.

With the growing emphasis on centralization of the maintenance force and the unattended operation of outlying offices, some means of automatically making a permanent record of trouble become necessary. It has been suggested heretofore that the trouble indicator be used to control some form of automatic typewriter to make a permanent record of the trouble, but such arrangements, while faster than manual recording, have proved slower than desirable.

The cross bar telephone system disclosed in the application of A. J. Busch, Serial No. 57,394, filed October 29, 1948, has been designed to use a trouble recorder of the card punch type without the intervention of an indicator. This trouble recorder is used to record not only the troubles appearing in the common control circuit but also those which are encountered by various other parts of the equipment such as the test circuit, and the automatic monitor. It may also be used by the test circuit to record properly completed calls.

Under normal conditions, troubles may be expected to occur at considerable intervals and are usually of such character that they may be corrected during a routine visit from the maintenance force. However, trouble may arise which affects large numbers of calls and which it is imperative to correct at the earliest possible moment. Such a trouble also produces trouble records at a high rate and, since these records all relate to one source of trouble, in effect, cause a wasteful use of the record cards.

In accordance with the present invention, means is provided to detect trouble requiring immediate attention and to limit the number of records made in connection with such troubles.

More specifically, means is provided to measure a time interval following each seizure of the trouble recorder and, during each measured interval, to count the number of trouble records made. If a predetermined number of records are made within the measured interval, the making of records is suspended by marking the trouble recorder unavailable.

To facilitate the operation of the recorder in case several records are to be made within a relatively short time, means is provided to keep the driving motor of the recorder running for a fixed interval following each operation of the recorder.

These and other features of the invention will be more clearly understood from a consideration of the following description, read in connection with the drawing in which.

Figure 9:
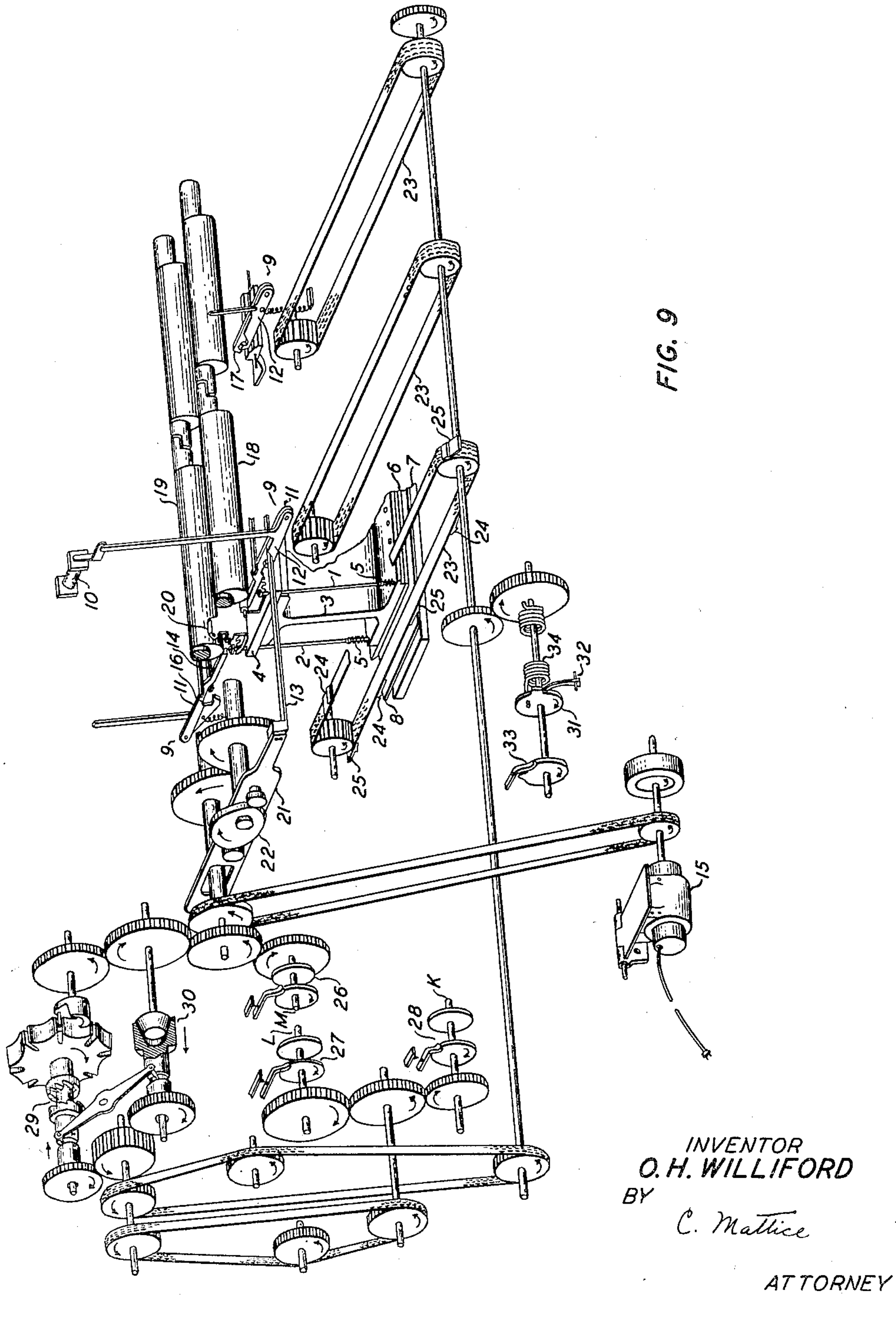
Fig. 9 is a schematic showing of a suitable trouble recorder.

Referring first to Fig. 9, the recorder comprises two rows of perforating punches 1 and 2, preferably sixty punches in each row, supported on the two sides of an I beam 3 and passing through aligned holes in a guide plate 4, mounted on the I beam 3, and in the base of the I beam. The punches are held in retracted position by means of springs 5. When depressed, they pass through aligned holes in the upper and lower die plates 6 and 7.

The punches are selected for operation by means of a corresponding set of interposer elements 9, each controlled by an individual interposer magnet 10. The interposer element includes a horizontal interposer bar 11 and a latch 12. A pair of drive bars 13 and 14 are continuously reciprocated when the motor 15 is operating, moving freely in recesses 16 in the interposer bars. When an interposer magnet is energized it lifts the corresponding latch 12, latching the interposer to the drive bar so that the interposer bar is moved into operative position. A latch stop 17, a fragment of which is shown in connection with the interposer at the right of the figure, serves to hold a lifted latch in place, independent of the interposer magnet as soon as the interposer bar, to which the lifted latch is attached, starts to move inward. The face of the latch stop 17 would engage any unlifted latch if the interposer bar should move forward accidentally and thus positively prevent the false operation of a punch. The actual punching operation is brought about by means of eccentric rollers 18 and 19 which are effective, when an interposer bar has been positioned, to drive the punch through a card between the die plates. As the rollers move out of punching position they act on retractors 20 which positively lift the punches back to their normal position. The retractor associated with the front roller has been broken off, to show the rear retractor 20 more clearly. The driven bars 13 and 14 are operated by a shuttle bar 21 which is in turn reciprocated by an eccentric cam 22 mounted on the axle of the roller 18, thereby making one reciprocal cycle for each revolution of the rollers.

The card is fed by means of three chain belts 23 on which are mounted hooks 24 and backstops 25. The unused cards are fed from a bin at the back of the recorder as shown in Fig. 9 and discharged into a bin at the front, neither bin being shown.

The recorder is driven by a motor 15, acting through a set of gears shown at the left of Fig. 9. The motor acts directly on the rollers and on the shaft M carrying the set of apparatus control cams 26. It acts on the card drive and on the shafts L and K carrying the circuit control cams 27 and 28 through either of two clutches 29 or 30 which may be selectively operated by magnets, not shown. Clutch 29 connects the intermittent drive or Geneva movement to the card and cam driving gears, while clutch 30 is a cone type clutch for imparting a continuous motion to the card and cam driving gears. In the well-known manner the Geneva movement imparts to the card a dwell for the punching operation and a rapid advance to the next punching position.

Cam 31 and latch 32 serve to stop the card and cam drive in the proper position at the end of one cycle of operations, cam 33 acting as a brake and spiral spring 34 cushioning the effect of latch 32. The M cams 26 make one revolution for each revolution of the rollers 18 and 19 and serve to synchronize the operation of the clutches with the position of the rollers and the punching apparatus. The set of L cams 27 make one revolution during one cycle of operation of the recorder, while the set of K cams 28 make three revolutions. Cams 27 control the circuits of the recorder, while cams 28 serve to operate a series of multicontact relays which connect the interposer magnets to the marker and other circuits for operation in accordance with the information to be recorded.

When the recorder is idle, a card is in position for receiving the first punching operation. Seizure of the recorder starts the motor if it is not running. Cams 26 time the operation of the first set of multicontact relays for the first punching operation, and the operation of the intermittent clutch 29. Eight additional punching operations are performed under the control of the intermittent clutch and cams 28. At the end of the ninth punching operation cams 27 cause the transfer from the intermittent clutch 29 to the continuous clutch 30, to feed the punched card to the used card bin and feed an unused card to operate position, transmit a "record complete" signal to the seizing circuit and control the stopping of the card and cam drive in its normal position. The times at which each of the M, L and K cams closes its respective contact during one punching operation is shown by the horizontal lines in Fig. 8.

As described in detail in the above-identified Busch application, the common control circuit or marker normally functions to control the establishment of three types of connections. When a call is originated, the marker is seized from the line link frame to set up a dial tone connection between the calling line and an originating register. When the called line number has been registered in the originating register, the register seizes an idle marker to control the setting up of a connection between the calling line and an outgoing trunk. When a call comes into the office over an incoming trunk, that trunk is associated with an incoming register, in which the called line number is registered and the incoming register seizes an idle marker to control the establishment of a connection between the incoming trunk and the called line. For a local call the marker connects both the calling line and the called line to a local or intra-office trunk, under the control of the originating register, no incoming register being employed.

Figure 5:
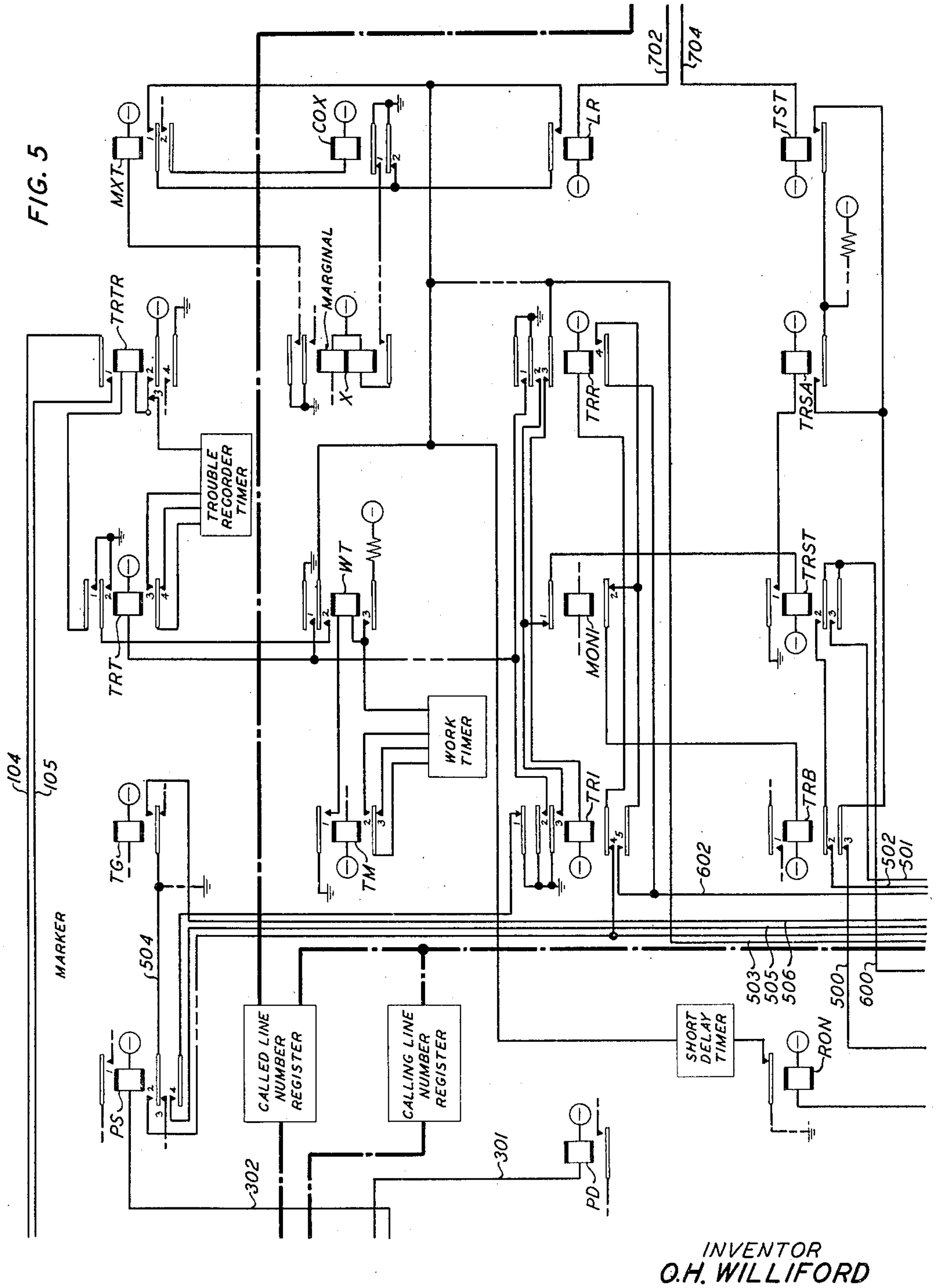
Fig. 5 shows part of a common control circuit or marker.

Referring now to Fig. 5, which shows a portion of the marker, whenever the marker is seized, whether by a line link frame, an originating register or an incoming register, timing relay TM is operated. At the same time a registration is set up on the calling line number register, the called line number register or both, depending upon the circuit seizing the marker. Relay TM at its lower front contact closes a circuit to start the operation of the work timer, and at its upper front contact prepares a circuit for work timing relay WT. When the marker completes its function relay TM releases, opening the circuit of relay WT and the start circuit of the work timer and closing a circuit for restoring the work timer to normal.

If, due to a trouble condition, relay TM is not released prior thereto, the termination of the work timing operation completes the circuit of relay WT and that relay operates locking at its lower contact independent of the timer. At its contact 1, relay WT closes an obvious circuit for trouble recorder timing relay TRT and, with relay TRT operated, closes at its contact 2 a circuit for relay TRI, extending from ground at contact 2 of relay TRT, contact 2 of relay WT, contact 3 of relay TRR, winding of relay TRI to battery. Relay TRI operates, closing a circuit from ground at its contact 3, contact 1 of relay MONI to the winding of the trouble recorder start relay TRST and battery.

Figure 4:
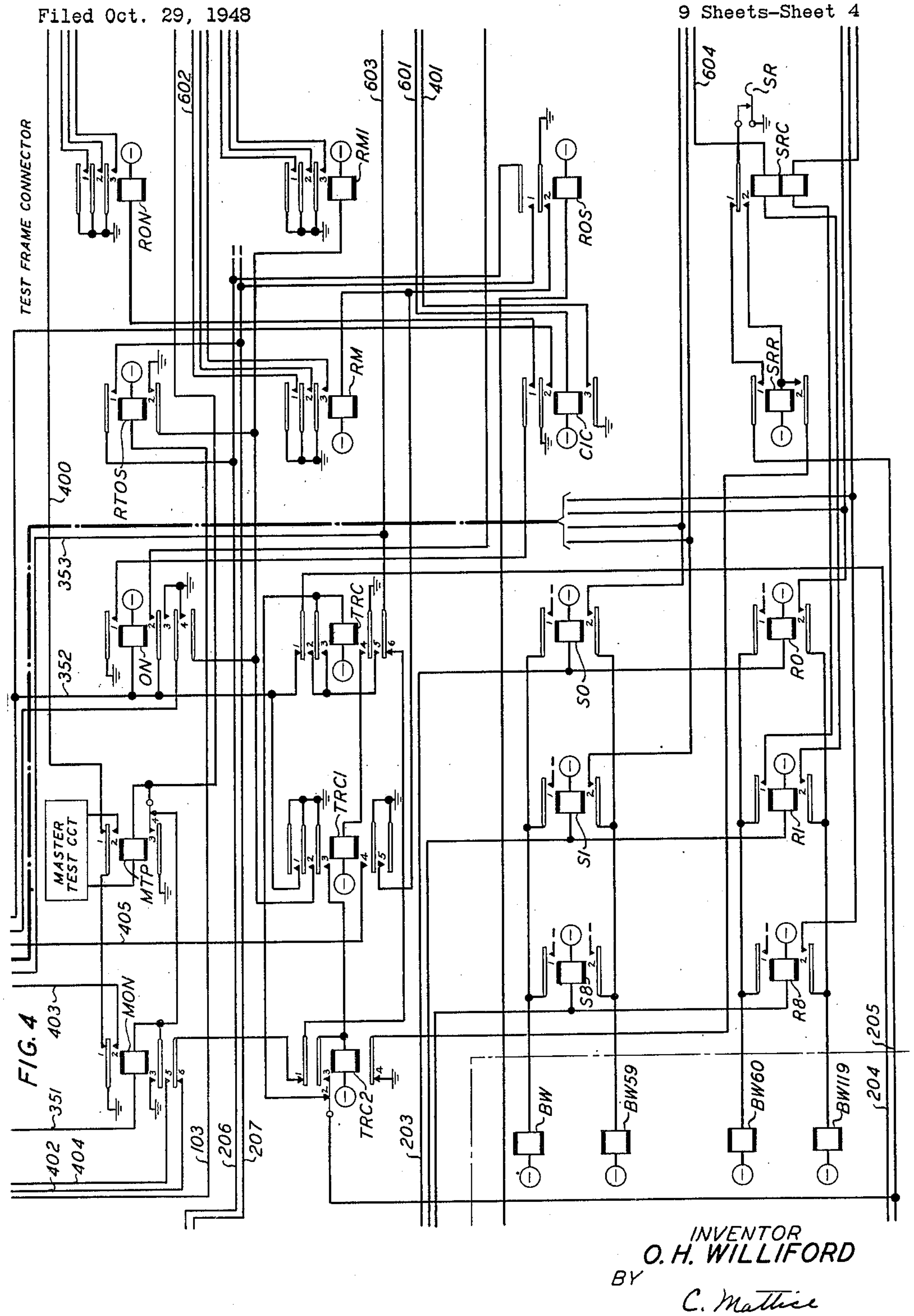
Figs. 4 and 6 show a test frame connector used for connecting the marker to the trouble recorder.
Figure 6:
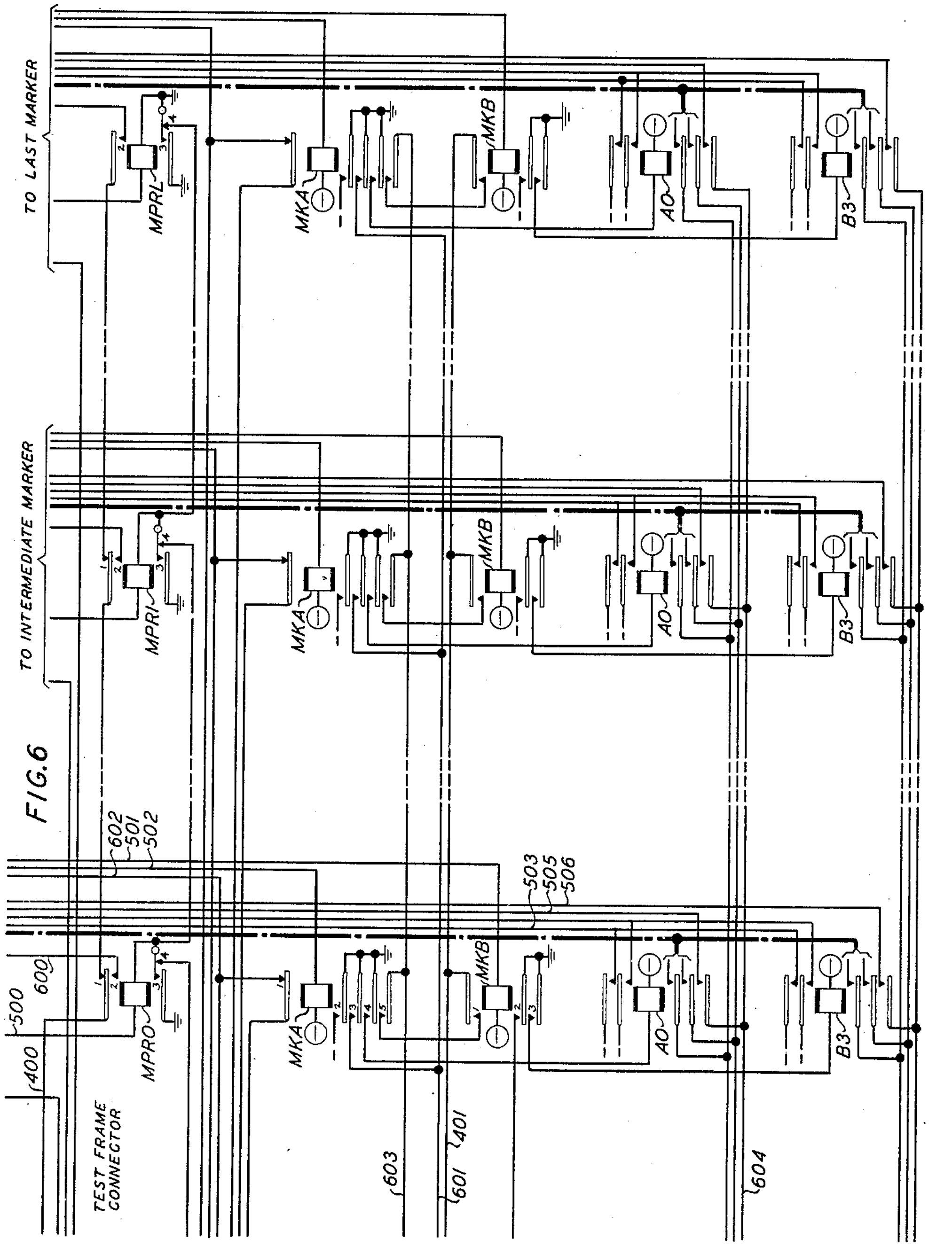

Relay TRST operates the auxiliary relay TRSA, which in turn prepares a start circuit for the test frame connector of Figs. 4 and 6 to associate the marker with the trouble recorder. This circuit extends from battery over the contact of relay TRSA, contact 3 of the trouble recorder busy relay TRB(5), conductor 500 to the winding of the marker preference relay MPRO. If no other marker preference relay is operated, this circuit is completed to ground over the normally closed contacts 4 of the remaining marker preference relays such as relays MPRI and MPRL. The circuit of a preference relay is also completed at the contact 3 of a preference relay earlier in the chain if that relay has been operated previously, in the present case if the automatic monitor preference relay MON or the master test preference relay MTP has been operated. However, with either relay MON or relay MTP operated, the operation of relay MPRO is ineffective until the previously operated relay releases.

Assuming that the test frame connector is idle when the circuit of relay MPRO is closed by the associated marker, relay MPRO operates and locks to ground over its contact 3. At contact 2, it closes a circuit from ground over contacts 1 of relays MON and MTP, contact 2 of relay MPRO, conductor 600, contact 3 of relay TRST, conductor 501, winding of relay MKB to battery. A parallel circuit extends from ground to conductor 600 as above traced, over contact 2 of relay TRST, contact 2 of relay TRB(5), conductor 502 to the winding of relay MKA and battery. Relays MKA and MKB operate, in turn operating relays AO and B3. Relays AO and B3 connect a plurality of conductors from the marker and associated circuits, including those grounded by the calling line number register and called line number register, to the scanning relays of Fig. 4.

As pointed out in describing the trouble recorder, there are two rows of punches, each containing sixty punches, which are driven through nine punching operations so that each record card is punched from a selection of one thousand and eighty possible items. Therefore it will be apparent that a number of relays such as relays AO and B3 will be required and additional relays such as relay MKA and MKB to operate them. However, since the present invention is not concerned with the nature of most of the items to be recorded only the typical relays MKA, MKB, AO and B3 have been shown.

Relay MKA at contact 3 connects ground to conductor 601, operating relay CIC which at contact 2 closes a circuit for off-normal relay ON(4). Relay ON(4) operates, locks under the control of relay MKB and operates relay RMI. Relay ON(4) also closes a circuit from ground over contact 1, contact 1 of relay CIC, winding of relay RON(4) to battery. Relay RMI connects ground to contact 1 of the relay MKA associated with each marker. Since relay MKA associated with marker O is operated, no circuit is completed to marker O. In the remaining markers, ground is connected to the conductor corresponding to conductor 602. In such markers, if the relay TRI is operated in an attempt to seize the trouble recorder, ground on conductor 602 is extended to the winding of relay TRB(5), operating that relay, to open the circuits of the corresponding marker preference relays and to dispose of the call in a different manner. Relay RON(4) operates relay RON(5) in each marker to render the short delay timer ineffective to operate the trouble recorder relay TRI.

With relay CIC operated, the start circuit for the trouble recorder is closed. This circuit may be traced from ground at contact 3 of relay CIC, conductor 401, contact 1 of relay MKB, contact 5 of relay MKA, conductor 603, contact 6 of relay TRC(4), contact 1 of relay TRC2, contact 6 of relay MON, conductor 402 to the winding of relay STR and battery. It will be observed that the above traced start circuit can be completed only after the relays MKA and MKB are operated to operate the connecting relays AO and B3 and after relays TRC(4) and TRC2 have been released when the trouble recorder has returned to its normal position following the completion of a previous trouble record as described hereinafter.

Start relay STR closes a circuit from ground at contact 1 of relay TRS, conductor 104, contact 1 of relay TRTR(1), contact 2 of relay STR to the winding of magnet S1 of the stepping switch S1. The function of switch S1 will be described later. It also closes a circuit from ground over the normally closed contact of key 101, contact 3 of relay STR to the winding of relay MC(1) and battery.

Relay MC(1) operates, locking over its contact 1 to ground at the back contact of relay MST(1). Relay MC(1) connects ground over contact 2 to conductor 102, completing a circuit over contact 6 of relay MCO to the winding of relay MC(2) and battery. Relay MC(2) closes the circuit of the operating motor OM. Relay MC(1) also controls a timing operation which will be described hereinafter.

Figure 8:
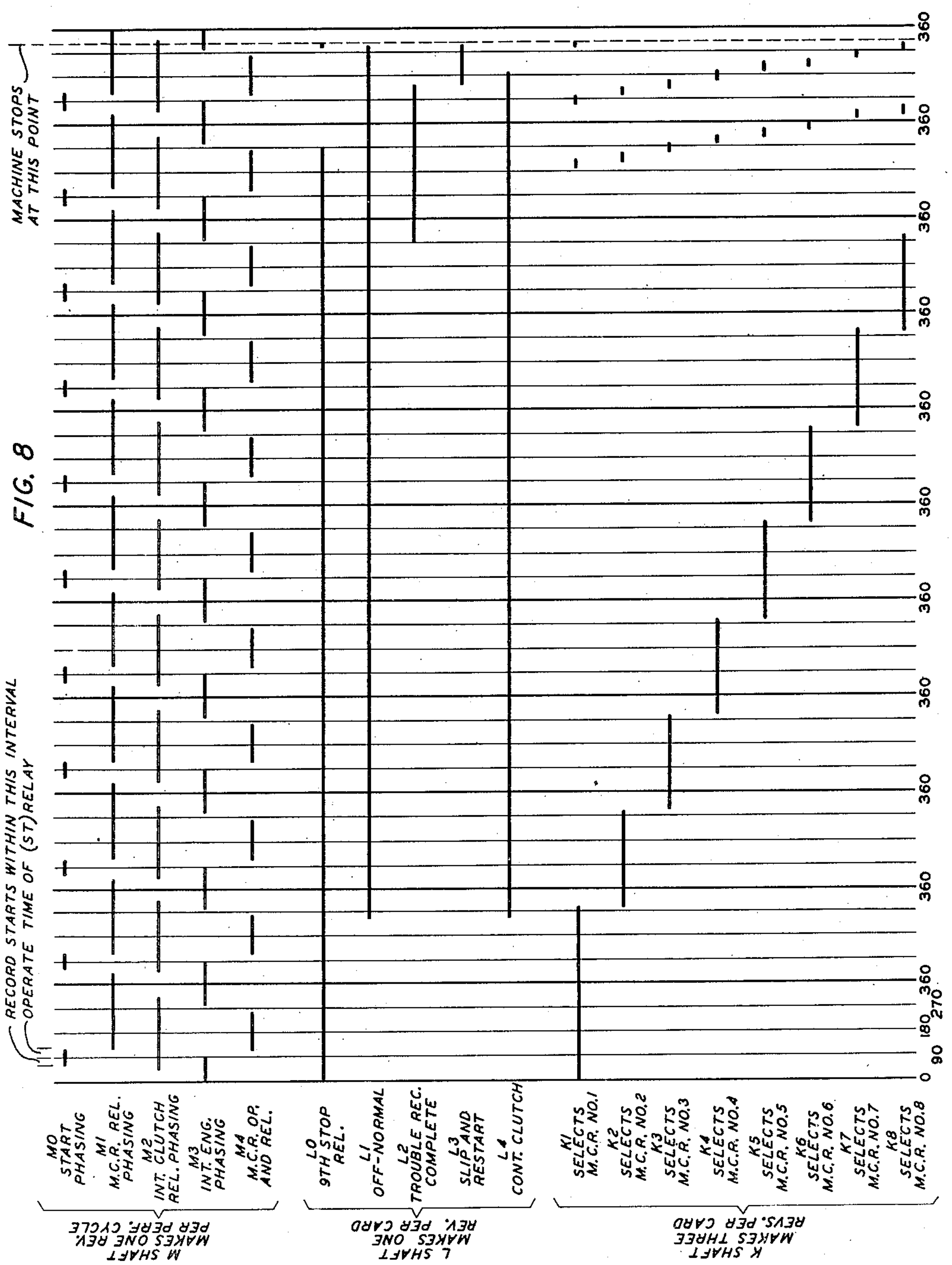
Fig. 8 shows in detail the relative times of closure of the control cams of the trouble recorder shown in Fig. 9.

Relay STR extends its operating ground over contact 4, and conductor 100 to the winding of relay TS(2) and battery. Relay TS(2) starts the timing operation controlled by condenser TO and tube TO and extends the ground on conductor 100 to conductor 201 and cam contact LO. As shown in Fig. 8, contact LO is closed with the recorder in normal position and is not driven from that position until the intermittent clutch is engaged so that the above traced circuit is extended to cam contact MO. At each revolution of the M shaft, which rotates in step with the punch rollers, cam MO is closed at the point shown in Fig. 8 and, when cam contact MO closes, the circuit above traced is extended to the winding of relay ST and battery. Relay ST operates, locking over contact 5 and cam LO to the ground applied to conductor 201 as above traced, independent of cam MO. Relay ST in addition connects ground over its contact 1, contact 3 of relay TRC1 (2), conductor 204, contact 1 of relay TRC(4) to the winding of relay ON(4) and battery to hold that relay operated. Relay ST, operated, also extends its locking ground over contact 4 to cams M3 and M4. The contact of cam M3 is open when relay ST first operates and no circuit is closed thereover at this time. However, the contact of cam M4 now closes and ground is extended thereover to the winding of relay SP and battery. Relay SP operates, closing a circuit from ground over its contact, contact 4 of the intermittent clutch magnet INT, conductor 203 to the windings of scanning relays SO and RO and battery. Relays SO and RO each connect sixty leads from the marker to the interposer magnets BWO to BW119, operating those interposer magnets which are connected to leads to which ground has been connected by the marker or associated circuit. As the motor continues to rotate, the punches selected by the operation of these interposer magnets are operated to record the corresponding information on the card.

After cam M4 opens its contact, releasing relay SP, cam M3 closes its contact extending ground over contact 2 and the winding of the intermittent clutch magnet INT to battery at contact 8 of relay MCO. The clutch magnet INT operates, closing a locking circuit for itself, over its contact 1 to ground at contact 2 of relay ST. Magnet INT operates the latch magnet LCH, releasing the recorder drive to permit the recorder to operate through one cycle, and causes the engagement of the recorder drive with the intermittent driving mechanism. In addition, magnet INT at contact 4 disconnects the contact of relay SP from conductor 203 and at contact 3, connects it to the cam contacts K1 to K8.

The first step of the intermittent drive moves the card to its second recording position. Cam K1 is closed when magnet INT operates and when cam M4 closes during its next revolution, operating relay SP, the next pair of scanning relays S1 and R1 are operated, to connect the next set of conductors to the interposer magnets BWO to BW119.

After the second punching operation, cams L1 and L4 close their contacts. The closure of the contact of cam L1 completes a circuit for relay ON(2) which connects a supplementary ground to the holding circuit for relay ON(4). The closure of contact L4 prepares a circuit for the continuous clutch magnet CONT which is ineffective at this time.

The M shaft continues to rotate one revolution for each recording position and the L shaft is advanced successively through positions 4 to 9 with a dwell period in each position to hold the card stationary while punches are driven and withdrawn. The K shaft causes cams K2 to K7 to close their contacts successively to connect the contact of relay SP successively to the intermediate scanning relays, cam K8 closing the circuit for relays S8 and R8. The operation of each successive pair of scanning relays connects a different set of leads from the marker or other circuit to the interposer magnets for successive positions of the card.

As the punches are being withdrawn and the M4 contact opens to release relay SP in the ninth recording position, cam L2 closes its contact completing a circuit from ground over cam contact L2 to the winding of relay TRC1(2) as an indication that the trouble record has been completed. Cam contact L2 remains closed until the L shaft returns to its normal position.

Relay TRC1(2) connects ground over its contact 2 to conductor 205, contact 2 of relay TRC2 to the winding of relay TRC(4) and battery. Relay TRC(4) opens the start circuit traced to conductor 402, releasing relay STR and opening the operating circuit of relays TS(2) and ST. However, since cam contacts M1 and LO are closed at this time, relay ST remains operated in a circuit from battery through its winding and contacts 5 and 3 and cam contact M1 to ground while relay TS(2) is held operated in a circuit from battery through its winding and contact 1, conductor 201, cam contact LO, contact 3 of relay ST and cam contact M1 to ground. Relay ST therefore remains operated, holding the intermittent clutch magnet INT operated until the intermittent drive approaches the next dwell position. When cam M1 opens its contact, relays ST and TS(2) release, but cam M2 closes its contact to hold magnet INT operated for the remainder of the L shaft movement to the dwell position.

When cam M2 opens its contact, magnet INT releases, disengaging the intermittent clutch and closing a circuit over its contact 6, contact of cam L4 to the winding of the continuous drive clutch magnet CONT and battery at contact 8 of relay MCO. This magnet causes the engagement of the L shaft with the high speed continuous drive which causes the card to be moved to the used card bin and a new card to be brought into the first recording position. Magnet INT opens the circuit for the latch magnet LCH to prepare the mechanical stop for the L shaft in its normal position. As the L shaft approaches normal, cam L4 opens its contact, releasing the magnet CONT, and permitting the L shaft to coast to the normal position.

In order to insure complete return to normal, should the L shaft fail to coast to normal, cam L3 is provided, which closes its contact as cam L4 opens its contact, closing a circuit for relay RSC which operates. When relay TRC1(2) operated as above described, it closed a circuit from ground at its contact 1, over contact 3 of relay RSC to battery through the winding of relay RST. When relay RSC operates, it opens the circuit of relay RST, which, being slow to release, closes its contacts after an interval. When relay RST has released, relay RSC closes a circuit over its contact 2, contact 2 of relay RST to the winding of clutch magnet CONT, causing the continuous clutch to reengage the L shaft and advance it to the centering position, where the contact of cam L3 opens, releasing relay RSC and the clutch magnet CONT. Since it is preferable that the recorder coast to normal, relay RCS also closes a circuit from ground over its contact 1, contact 1 of relay RST to the winding of relay SCA and battery. Relay SCA locks over its contact 2, contact of key AR to ground. At contact 1 it lights lamp SCA and at contact 3 connects battery through resistance E1 to conductor 206 to operate a minor alarm which may be sounded locally or transmitted to an associated attended office.

At the test frame connector, relay TRC(4), which operated over conductor 205, locks over its contacts 3 and 5 to conductor 603 which is held grounded under the control of the marker at which the trouble record originated. Relay TRC(4) at contact 4 closes an obvious circuit for relay TRC1(4). Relay TRC1(4) operates relay TRC2 which locks over its contact 2 to conductor 205. Relay TRC2 therefore holds the start circuit of the recorder open until the machine has reached its normal position.

When the L shaft reaches normal the contact of cam L2 opens, releasing relay TRC1(2) thereby disconnecting ground from conductor 205 and releasing relay TRC2.

Relay TRC1(4), in addition to operating relay TRC2 at contact 5 closes a circuit for relay RM. Relay RM operates, connecting ground directly to conductor 602 to operates relay TRB(5) in the marker connected to the trouble recorder, as a signal that the record has been completed and the marker may release. Ground connected to the corresponding conductor of the other markers is ineffective, since the relays TRB of such markers were previously operated by the operation of relay RMI.

At contact 2, relay TRB(5) opens the circuit of the marker preference relay MPRO and, at contact 3, opens the circuit of relay MKA releasing relays MPRO and MKA. Relay MPRO opens the circuit of relay MKB. With relays MKA and MKB released, the multi-contact relays AO and B3 are also released, disconnecting the marker and other circuits from the trouble recorder. Relay MKA also releases relay CIC, in turn releasing relay ON(4), and relay RON(4). Relay RON(4) releases relay RON(5) to render the short relay timer again effective in this as well as the other markers. Relay ON(4) releases relay RMI to release relay TRB(5) in all of the markers waiting for the use of the trouble recorder. The release of relays MKA and MKB opens one holding circuit for relay TRC(4), while the return of the recorder to normal opens the other holding circuit for relay TRC(4). The release of relay MPRO permits another marker to operate a preference relay in the test frame connector, while the release of relay TRC(4) permits the test frame connector to seize the recorder for a subsequent recording operation.

When relay STR is released as above described, it opens the circuit of magnet S1, causing switch S1 to advance to count one record. It also opens the operating circuit for relay MC(1), but that relay remains operated, being locked to the back contact of relay MST, and holds the circuit of relay MC(2) closed to keep the recorder motor running, in order to reduce the recording time in case several records are made within a relatively short time.

With relay MC(1) released or relay STR operated, condenser C1 is short-circuited, but with relay MC(1) operated and relay STR released 130-volt battery is connected through resistance to one side of condenser C1 while ground through the winding of relay MST(1) is connected to the other side of the condenser, which starts charging. The charge potential of the C1 condenser is impressed on the control anode of the gas-filled tube MCT through resistance D1.

If relay STR does not reoperate within a predetermined interval, the charge potential on the C1 condenser will rise to the point that the MTC tube ionizes and the MST relay operates. This operation of relay MST releases relays MC(1) and MC(2) which stops the trouble recorder motor, releases relay MST, opens the cathode circuit of tube MTC, deionizing it and discharges condenser C1 through resistance C.

If relay STR reoperates before the predetermined time interval elapses, it closes a discharge circuit for condenser C1 so that this time interval is started afresh at each release of relay STR and the motor continues to run until the time between two records is greater than the predetermined interval.

When switch S1 is advanced from the normal position shown, in response to the operation and release of relay STR, a circuit is closed from ground over the strapped terminals of brushes S11 and S14 through the winding of relay TS(1) to battery. Relay TS(1) opens a shunt around condenser C4, permitting the condenser to charge in a circuit extending from 130-volt battery, resistance E, condenser C4, contact 2 of relay TS(1), winding of relay RBT and ground. The charging potential on condenser C4 is impressed on the control anode of gas-filled tube NRT through resistance G. After a predetermined interval determined by the capacity of condenser C4, and the value of resistance E tube NRT ionizes and relay RBT operates. Relay RBT, at contact 2, connects ground to the strapped terminals of brushes S12 and S13 and thence over the back contact and winding of magnet S1 to battery, completing a self-interrupting circuit for restoring switch S1 to normal, where the circuit of magnet S1 is opened and switch S1 comes to rest. With switch S1 normal, relay TS(1) is released, discharging condenser C4 and deionizing tube NRT.

Each time that relay STR operates and releases during the charging of condenser C4, switch S1 is advanced one step. By means of the numbered cross-connections provided in connection with the terminals of brushes S15 and S16, any number of records between 1 and 39, to be accepted during one time interval, may be predetermined. Assuming that terminal TRB is cross-connected to terminal 10, the receipt of ten records within the time measured by condenser C4 and tube NRT will suspend the operation of the recorder in connection with markers. When crush S15 reaches terminal 10, a circuit is closed from ground at contact 1 of relay RBT, brush S15, terminal 10, terminal TRB, winding of relay TRS and battery. Relay TRS operates and locks to ground over its contact 3 and contact 3 of relay TS(1). At contact 1, relay TRS opens the circuit by which magnet S1 is normally operated. At contact 2 it lights lamp TOS and at contact 4 connects ground from the contact of key CTOS to conductor 103 and thence to the winding of relay RTOS and battery. Relay RTOS operates relay RM1, which in turn operates relay TRB in each marker which attempts to seize the trouble recorder while relay TRS remains operated. Relay RTOS also connects together conductors 206 and 207 so that a minor alarm, operated in association with the seizure of the trouble recorder, will be changed to a major alarm. When the time interval measured by condenser C4 and tube NRT ends, relay RBT operates, releasing relay TRS and again permits the acceptance of trouble records from markers.

If a marker is unable to obtain access to the trouble recorder because of trouble in the connecting circuits at the test frame connector, it may still give an indication that such a trouble has occurred by causing the trouble to be counted by switch S1. When relay TR1 operated in the marker to call in the trouble recorder, it operated relay TRT, as above described, to start the operation of the trouble recorder timer in the marker. If this timer completes its operation, relay TRTR(5) operates, locking under the control of relay TRT, and closes a circuit from ground at contact 1 of relay TRS, conductor 104, contact 1 of relay TRTR(5), conductor 105, upper winding of relay TRTR(1) in the trouble recorder control circuit to battery. Relay TRTR(1) closes a circuit from ground at contact 1 of relay TRS, conductor 104, contact 2 of relay TRTR(1), contact 1 of relay STR, winding of magnet S1 to battery, operating magnet S1. A branch of this circuit extends over the back contact of magnet S1, contact 3 of relay RBT, contact 3 and lower winding of relay TRTR(1) to battery, to hold relay TRTR(1) operated until the magnet S1 has operated, to insure the advance of the switch. Relay TRTR(5) also closes a circuit to bring about the release of the marker and thereby its own release. When relay TRTR(5) releases, relay TRTR(1) also releases, releasing magnet S1 to step switch S1 one step to count the trouble.

Relay STR also controls circuits to the time-of-day circuit to prepare that circuit for recording the time of day on the cards.

In addition to troubles in the marker indicated by the operation of the work timer, the marker may call in the trouble recorder in response to certain specific troubles in the marker or in response to troubles indicated to it by other circuits associated therewith during the attempted establishment of a connection.

The marker employs a number of sets of relays, of which in normal operation one only operates and the operation of two or more is an immediate indication of a trouble condition. To detect such a condition, each set of relays receives its battery supply through a common marginal cross-detecting relay which is adjusted to remain unoperated when only one relay of the associated set is operated and to operate when two or more relays of the set are operated. Such a relay is indicated by relay X. When relay X operates, it locks under the control of relay COX and operates relay MXT. Relay MXT closes a circuit from ground at contact 2 of relay COX, contact 1 of relay MXT, contact 3 of relay TRR to the winding of relay TR1 and battery. Relay TR1 operates, calling in the trouble recorder as previously described. In addition to recording the calling line number, the called line number and other information regarding the call being attempted, a branch of the operating circuit for relay TR1 is extended over conductor 503 to the multicontact relays to cause a record to indicate the type of trouble encountered.

Figure 7:
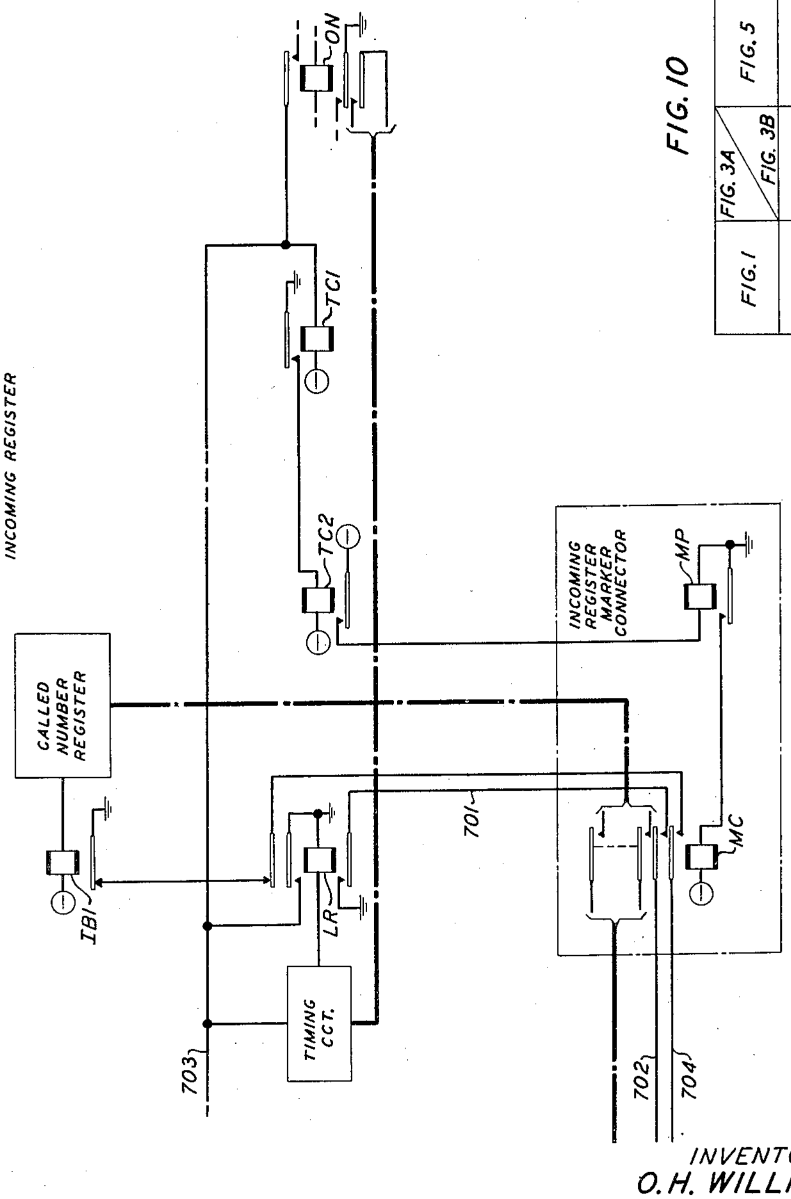
Fig. 7 shows part of an incoming register.
Figure 10:
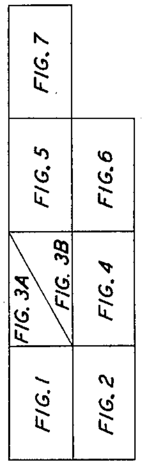
Fig. 10 shows the proper arrangement for Figs. 1 to 7. In the drawing where a similarly designated relay appears in more than one figure, the figure number follows in parenthesis.

Portions of an incoming register are shown in Fig. 7. As fully described in the Busch application previously mentioned, such a register is normally seized in response to a call received on an incoming trunk, receives the called line number, connects with an idle marker by means of an incoming register marker connector, and transmits the called line number thereto to permit the marker to establish a connection between the incoming trunk and the wanted line.

As soon as such an incoming register is seized the off-normal relay ON(7) is operated and that relay closes a circuit for starting the operation of the associated timing circuit. If the register is not returned to normal, and relay ON(7) released before the timing circuit completes its function, relay LR(7) operates under the control of the timing circuit, closing a circuit for relay TC1, which in turn operates relay TC2. Relay TC2 operates the register preference relay in the marker connector which, when a marker is available operates multicontact relay MC(7) to connect the called number register of the incoming register to the corresponding register in the marker as well as closing certain other leads which transfer other items of information to the marker. Since relay LR is operated, ground is connected over conductor 701 through the marker connector to conductor 702 and the winding of relay LR(5) in the marker. Relay LR(5) calls in the trouble recorder to make a record of the trouble.

In making certain trunk tests, the incoming register is employed to seize the marker and the trouble recorder without setting up a called line registration. In such a case, ground is connected by the test circuit to conductor 703, operating relays TC1 and TC2 to seize a marker. Since the called line register is not operated, relay IB1 is normal and a circuit is closed from ground at the back contact of relay IB1, back contact of relay LR, through the marker connector to conductor 704, winding of relay TST and battery. Relay TST connects battery to conductor 500 to operate the marker preference relay MPRO and call in the trouble recorder.

Figure 1:
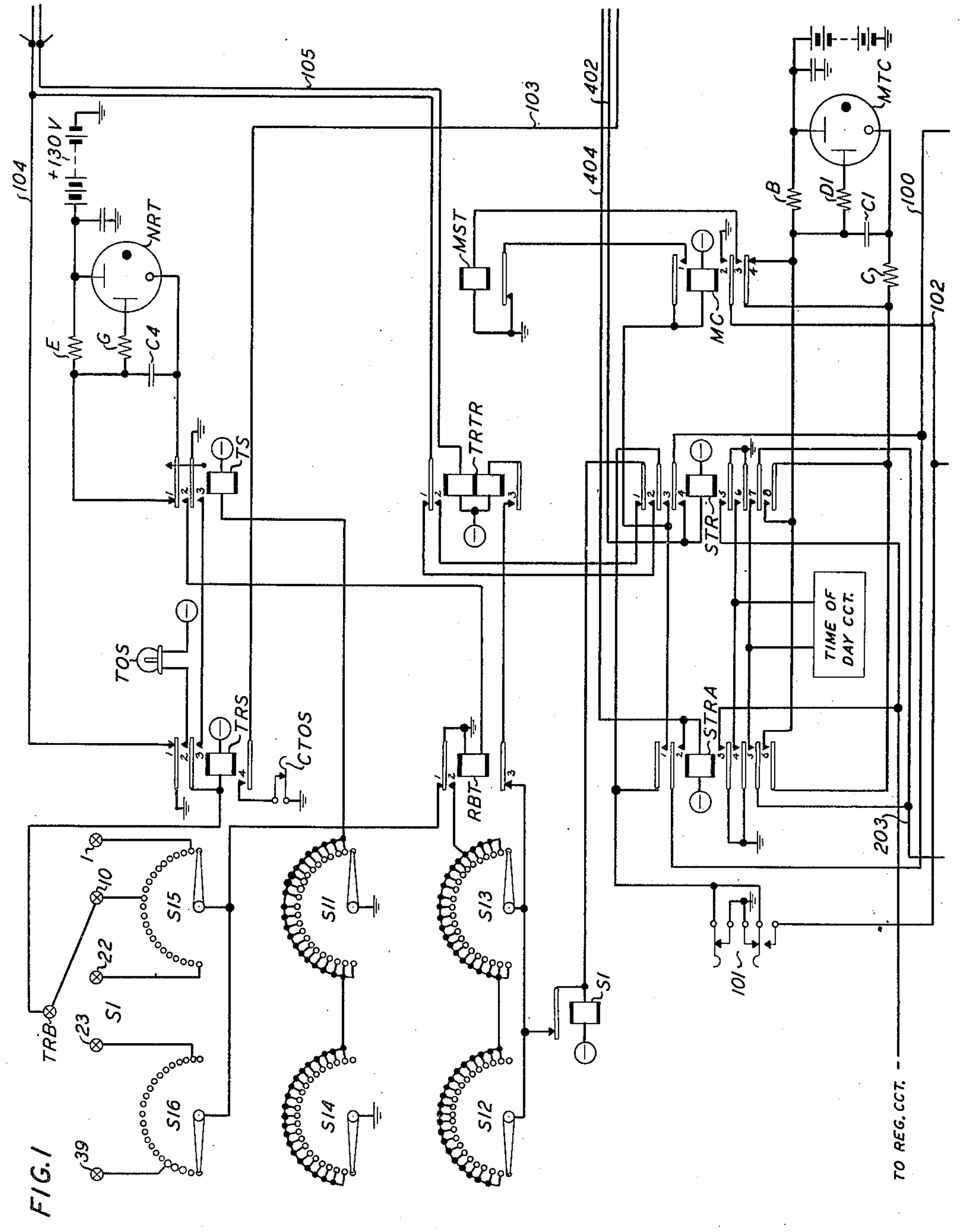
Fig. 1 shows the timing and counting circuit for the trouble records.
Figure 2:
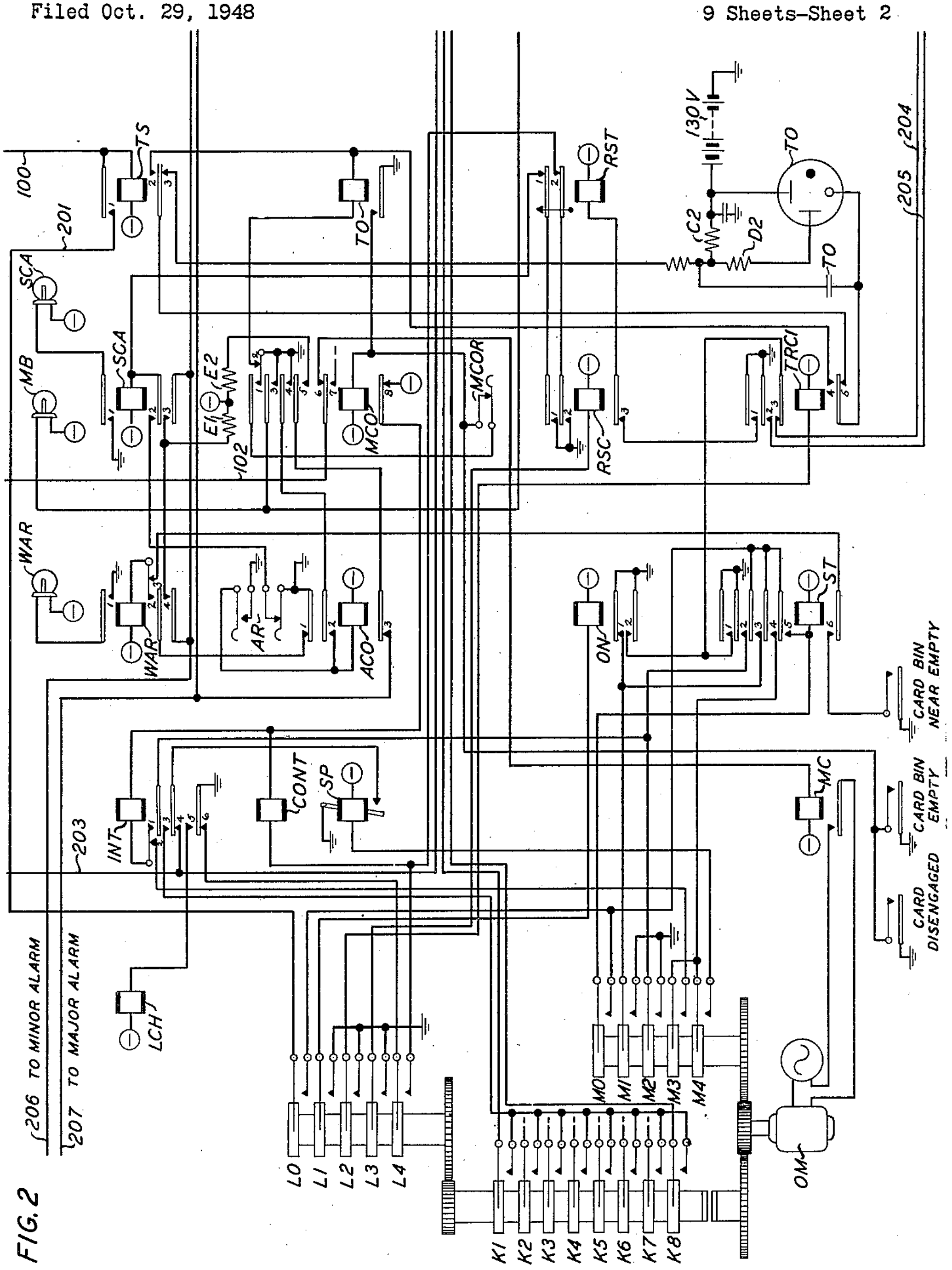
Fig. 2 shows the operating circuits of the trouble recorder.
Figure 3B:
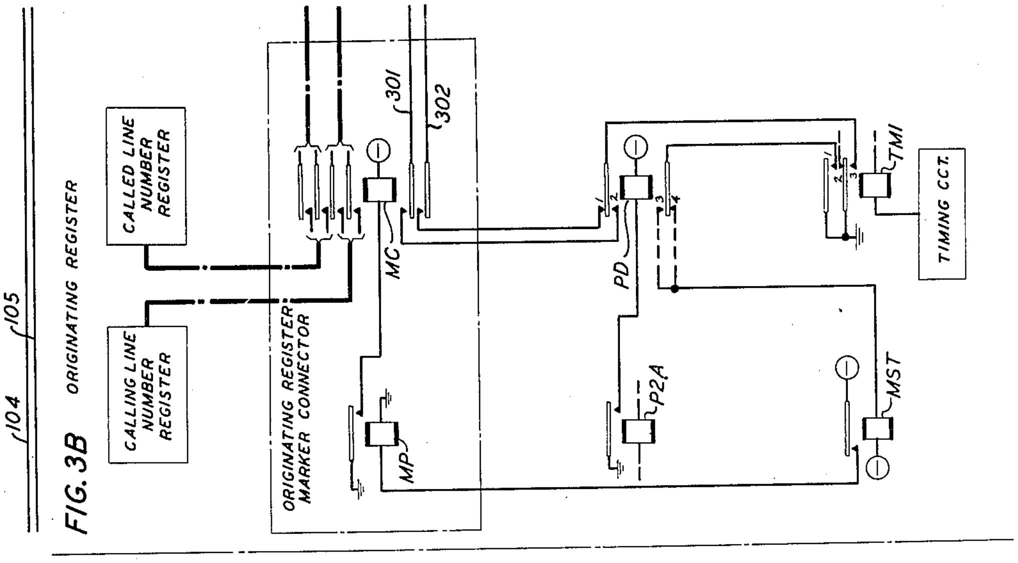
Fig. 3B shows part of an originating register.

The marker may also serve to control a trouble record when the trouble exists in an originating register. As described in the Busch application above identified, in the establishment of a normal connection the calling line, when it initiates a call, is connected to a marker which makes a record of the identity of the calling line, connects the line with an originating register, passes the line identification to the register and releases. The originating register receives the called line number from the calling line and then calls in a marker to control the completion of the desired connection. As soon as the originating register (Fig. 3B) is seized, its timing circuit is started and, if it completes its functions before the register releases, operates relay TM1, which in turn operates relay MST(3). Relay MST(3) operates the register preference relay MP(3) in the originating register marker connector, which, when a marker is available, operates multicontact relay MC(3B) which connects the calling line number register and the called line number register to the corresponding registers of the marker together with other leads, not shown, which normally assist the marker to set up the desired connection. If a number has been partially recorded, relays P2A and PD(3) will have been operated and relay TM1 connects ground over its contact 3, contact 2 of relay PD(3), through the marker connector to conductor 301 to the winding of relay PD(5) and battery. The marker responds to the operation of relay PD(5) substantially as to a call for a vacant code and therefore is of no interest in this connection.

However, if no dialing operation follows the seizure of the register, so that relay PD(3) is not operated, when relay TM1 operates, it connects ground over contact 1 of relay PD(3) through the marker connector to conductor 302, winding of permanent signal relay PS to battery. The register transfers the calling line identification to the marker and relay PS controls the operation of the marker to set up a connection between the calling line and a permanent signal trunk.

When the marker is ready to release the originating register, it connects ground to conductor 504 completing a circuit over contact 2 of relay PS, contact 4 of relay TR1, winding of relay TRR and battery operating relay TRR. The functions of relay TRR are the same as those of relay TR1, except that it closes a normal release circuit (not shown) for the associated register instead of the trouble release circuit provided by relay TR1. When the test frame connector operates as previously described, a circuit is closed from ground at contact 1 of relay TR1, contact 4 of relay PS, conductor 505, contact of multicontact relay AO, conductor 604, upper winding of relay SRC to a contact on scanning relay R1. When relay R1 operates during the second punching period, relay SRC operates in series with the corresponding interposer magnet BW119. With relay SRC operated, a circuit is closed from ground over the normally closed contact of key SR, contact 2 of relay SRC, winding of relay SRR to battery. Relay SRR locks to ground at contact 4 of relay TRC2. At the end of the punching period, when relay R1 releases, relay SRC releases, closing a circuit from ground on key SR over its contact 1, contact 1 of relay SRR, contact 2 of relay TRC2, winding of relay TRC(4) to battery. Relay TRC(4) operates, in turn operating relays TRC1(4) and TRC2, opening the start circuit to the trouble recorder, to release the intermittent clutch, and thereby moving the card to the used card bin without further punching operations. Relay TRC2, in operating, releases relay SRR, but relay TRC(4) remains locked over conductor 204, contact 3 of relay TRC1(2) to ground at contact 2 of relay ON(2), relay ON(2) being held operated over the contact of cam L1 until the recorder reaches normal. As previously described, cam L2 closes its contact as the recorder passes out of the ninth recording position, operating relay TRC1(2) which connects ground to conductor 205 holding relay TRC2 operated until the recorder reaches normal.

Under certain conditions, while the marker is associated with an outgoing sender, relay TG may be operated. If a trouble is encountered with relay TG operated, when the trouble recorder has been seized, ground is connected over the contact of relay TG, conductor 506, contact of relay B3, through the lower winding of relay SRC to a contact of scanning relay R1. Therefore when relay R1 operates to control the second punching operation relay SRC operates in series with interposer magnet BW60 and functions as above described to restore the recorder to normal under the control of the continuous drive. Since the operating circuit of relay TRC(4) controlled by relays SRC and SRR is closed over key SR, the early operation of relay TRC(4) may be cancelled at will and all records pass through the nine recording positions under the control of the intermittent drive.

The trouble recorder may also be used by the master test circuit to record either successful or unsuccessful tests.

In addition, the automatic monitor, which is disclosed in detail in the application of J. W. Dehn et al., Serial No. 68,556 filed December 31, 1948, uses the trouble recorder. Briefly, the automatic monitor may be connected to any one of the originating registers, incoming registers or outgoing senders and receives the called line number as recorded therein. It also connects with the marker and receives the called line number as set up in the marker, checks the two registrations and releases if they are the same. If the two registrations fail to check, the monitor calls in the trouble recorder and makes a record of the two registrations.

Figure 3A:
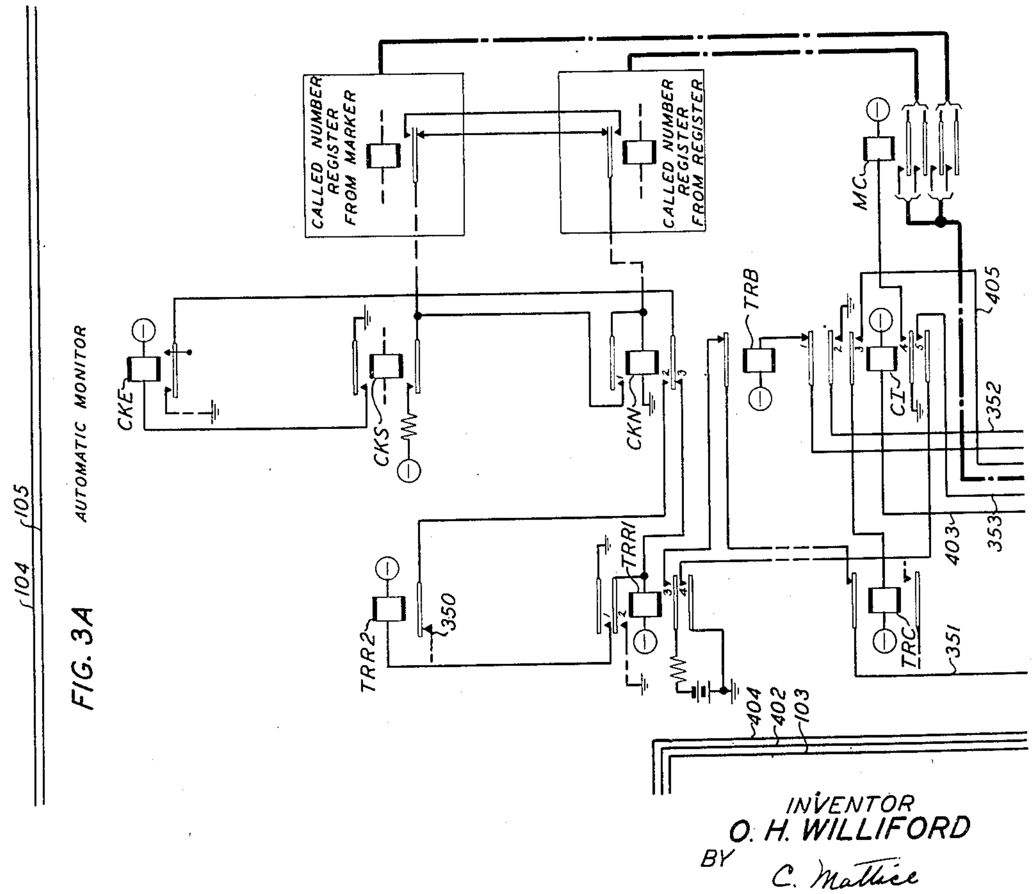
Fig. 3A shows part of an automatic monitor circuit.

A portion of the automatic monitor is shown is Fig. 3A. When the monitor is ready to check the two registrations relay CKS is operated, in turn operating relay CKE after an interval determined by the slow operating characteristic of the latter relay. If the registrations are identical, that is, if corresponding relays in the two registers are both operated or both normal, a circuit is closed from battery, over the contact of relay CKS through the two registers to the winding of relay CKN and ground. Relay CKN operates and locks under the control of relay CKS. With relay CKN operated, the subsequent operation of relay CKE closes a circuit over contact 2 of relay CKN and the back contact or relay TRR2 to conductor 350 to bring about the release of the monitor.

If the two registrations do not check and relay CKN has not operated, when relay CKE operates it closes a circuit from ground over its contact, contact 3 of relay CKN, winding of relay TRR1 to battery. Relay TRR1 locks to off-normal ground, operates relay TRR2 to open the normal release circuit and closes a circuit for seizing the trouble recorder. This circuit may be traced from battery over contact 3 of relay TRR1, normal contact of relay TRB, normal contact of relay TRC, conductor 351 to the winding of relay MON in the test frame connector. If neither the master test circuit nor any marker is using the trouble recorder, the circuit of relay MON is completed to ground over contacts 4 of relays MTP, MPRO, MPRI and the other marker preference relays and relay MPRL so that relay MON operates, locking to ground at its contact 3. At contact 2, relay MON connects ground to conductor 403, operating relay CI. Relay CI connects ground to conductor 352 to operate relay ON(4), opens the circuit of relay TRB, operates multicontact relay MC(3A) to connect the two called number registers to the test frame connector and closes a circuit from ground at contact 4 of relay TRR1, contact 5 of relay CI, conductor 353, contact 6 of relay TRC(4), contact 1 of relay TRC2, contact 5 of relay MON, conductor 404, winding of relay STRA and battery Relay STRA operates in this circuit. The functions of relay STRA are the same as those previously described for relay STR, except that it does not operate the counting switch S1, and the trouble recorder proceeds to make a nine-step record as above described. It will be noted that the conductors carrying the information to be recorded are connected directly to the contacts of the scanning relays RO, SO, to R8, S8 so that none of the multicontact relays of the test frame connector need be operated. When the record is complete and relays TRC (4) and TRC1(4) are operated as previously described, relay TRC1(4) connects ground to conductor 405, completing a circuit for relay TRC(3) over contact 3 of relay CI. Relay TRC(3) opens the circuit of relay MON, releasing relay MON and in turn relay CI, to release the trouble recorder and the test frame connector. With the operation of relay TRC(3) the automatic monitor is restored to normal.

Means is provided in connection with the trouble recorder to prevent its operation in case of certain major troubles, such as failure to operate in the proper length of time, exhaustion of the card supply or a displacement of a card while passing through the recorder which might interfere with subsequent records.

When relay TS(2) operates, as previously described, it connects ground over contact 2 of relay MCO, winding of relay TO, contact 2 of relay TS(2), contact 5 of relay TRC1(2) to one side of condenser TO, the other side of which is connected to 130-volt battery through resistance C2 and starts condenser TO charging. It also opens at contact 3 a normally closed discharge circuit for condenser TO. When relay TRC1(2) operates, it closes at contact 4 a substitute circuit for relay TO. If relay TS(2) remains operated alone, or in combination with relay TRC1(2) for a time predetermined by the capacity of condenser TO and the value of resistance C2, the potential applied to the control electrode of tube TO through resistance D2 due to the charging of condenser TO causes tube TO to ionize and operate relay TO.

Relay TO operates relay MCO which locks over the contact of key MCOR to ground at its contact 1, disconnects ground from the winding of relay TO, lights lamp MB, opens the circuit of relay MC(2) and removes battery from the winding of the clutch magnets INT and CONT. Relay MC(2) opens the circuit of motor OM so that the recorder cannot be operated. In addition, relay MCO closes a circuit from battery through resistance E2, contact 5 of relay MCO, contact 3 of relay ACO to major alarm conductor 207. If the office is attended, battery on conductor 207 sounds a local alarm indicating a major trouble, or if the office is unattended, causes the transmission of a similar alarm to the associated attended office. Relay MCO also operates relay ROS which in turn operates relay RM, to operate the TRB relays in all markers to indicate that the trouble recorder is not available. Relay ROS also connects together conductors 206 and 207 to insure a major alarm indication.

Relay MCO is also operated by means of contacts mounted on the chains which drive the cards, which are permitted to close if a card is not advanced properly. It is also operated, if all of the unused cards are used, by contacts associated with the card bin.

Means is also provided for operating a set of contacts when the card supply becomes low, consisting of another set of contacts associated with the card bin. With relay ST operated, and these contacts closed, a circuit is completed for warning relay WAR which locks under the control of the alarm cut off relay ACO, lights the warning lamp WAR and connects battery through resistance E1 to the minor alarm conductor 206.

Key AR and relay ACO provide means for silencing the alarms while the maintenance force is working on the recorder.

What is claimed is:

1. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means under the control of said counting means to mark said trouble recorder busy and means under the control of said timing means to remove said busy marking.

2. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means to mark said trouble recorder busy and means under the control of said timing means to remove said busy marking.

3. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means to mark said trouble recorder busy and means under the control of said timing means to remove said busy marking and to restore said counting means to normal.

4. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means, prior to the completion of said timing operation to mark said trouble recorder busy, and means responsive to complete operation of said timing means to remove said busy marking.

5. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means, prior to the completion of said timing operation to mark said trouble recorder busy, and means responsive to complete operation of said timing means to remove said busy marking, and to restore said timing means.

6. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means, prior to the completion of said timing operation to mark said trouble recorder busy, and means responsive to complete operation of said timing means to remove said busy marking, and to restore said timing means and said counting means to normal.

7. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means, prior to the completion of said timing operation to mark said trouble recorder busy, means responsive to complete operation of said timing means to remove said busy marking, and to restore said timing means and said counting means to normal, and means responsive to the next subsequent seizure of said trouble recorder to restart said counting means and said timing means.

8. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, timing means and counting means individual to said trouble recorder, means to simultaneously start the operation of said timing means and said counting means, means to operate said counting means each time that said trouble recorder is seized, means responsive to a predetermined operation of said counting means, prior to the completion of said timing operation to mark said trouble recorder busy and to operate an alarm, and means responsive to complete operation of said timing means to remove said busy marking and to terminate said alarm.

9. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, a motor for driving said trouble recorder, an operating circuit for said motor, means responsive to the seizure of said trouble recorder to close said operating circuit, clutch means also responsive to the seizure of said trouble recorder to associate said trouble recorder with said motor during one recording operation, means responsive to the completion of said one trouble recording operation, to release said trouble recorder from said motor, timing means individual to said trouble recorder, means under the control of said releasing means to start the operation of said timing means, and means to hold the operating circuit for said motor closed until said timing means completes its operation.

10. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, a motor for driving said trouble recorder, an operating circuit for said motor, means responsive to the seizure of said trouble recorder to close said operating circuit, clutch means also responsive to the seizure of said trouble recorders to associate said trouble recorder with said motor during one recording operation, means responsive to the completion of said one trouble recording operation to release said trouble recorder from said motor, timing means individual to said trouble recorder, means under the control of said releasing means to start the operation of said timing means, means to hold the operating circuit for said motor closed until said timing means completes its operation, and means responsive to the seizure of said trouble recorder during said timing operation to restart said timing means.

11. In a telephone system, automatic switches, control equipment, means in said control equipment for operating said switches, a trouble recorder, means under the control of said control equipment in case of trouble to seize said trouble recorder if said recorder is idle, means responsive to such seizure to mark said trouble recorder busy, a motor for driving said trouble recorder, an operating circuit for said motor, means responsive to the seizure of said trouble recorder to close said operating circuit, clutch means also responsive to the seizure of said trouble recorder to associate said trouble recorder with said motor during one recording operation, means responsive to the completion of said one trouble recording operation to release said trouble recorder from said motor, timing means individual to said trouble recorder, means under the control of said releasing means to start the operation of said timing means to measure a predetermined time interval, and means responsive to each seizure and release of said trouble recorder to restart said timing means to measure said predetermined timed interval.

OSCAR H. WILLIFORD.

REFERENCES CITED

The following references are of record in the file of this patent:

UNITED STATES PATENTS

| Number | Name | Date |
|---|---|---|
| 1,614,285 | Craft | Jan. 11, 1927 |
| 1,620,286 | Potts | Mar. 8, 1927 |
| 1,943,130 | MacPherson | Jan. 9, 1934 |
| 2,263,291 | Dowey | Nov. 18, 1941 |
| 2,350,466 | King | June 6, 1944 |